United States Patent
Fant et al.

(10) Patent No.: US 7,096,385 B1
(45) Date of Patent: Aug. 22, 2006

(54) METHOD AND SYSTEM FOR TESTING A MICROPROCESSOR

(75) Inventors: Richard G. Fant, Austin, TX (US);
Kevin E. Ayers, Leander, TX (US);
Paul B. Hokanson, Bastrop, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 679 days.

(21) Appl. No.: 10/244,363

(22) Filed: Sep. 16, 2002

(51) Int. Cl.
*G06F 11/00* (2006.01)

(52) U.S. Cl. .............................. 714/30; 714/31; 714/33

(58) Field of Classification Search .................. 714/30, 714/31, 33
See application file for complete search history.

(56) References Cited

U.S. PATENT DOCUMENTS

| | | | |
|---|---|---|---|
| 6,016,554 A | 1/2000 | Skrovan et al. | |
| 6,055,656 A * | 4/2000 | Wilson et al. | 714/724 |
| 6,687,857 B1 * | 2/2004 | Iwata et al. | 714/38 |
| 6,832,345 B1 * | 12/2004 | Corteville et al. | 714/48 |
| 6,910,155 B1 * | 6/2005 | Ku | 714/30 |
| 2002/0184562 A1 * | 12/2002 | Nadeau-Dostie et al. | 714/30 |

* cited by examiner

*Primary Examiner*—Scott Baderman
*Assistant Examiner*—Timothy M. Bonura
(74) *Attorney, Agent, or Firm*—Meyertons Hood Kivlin Kowert & Goetzel, P.C.; B. Noël Kivlin; Stephen J. Curran

(57) ABSTRACT

A method and system for testing a microprocessor. The method includes executing debug application software on an external device, downloading diagnostic program instructions from the external device to a cache memory within the microprocessor via a serial test interface. Once the diagnostic program instructions are loaded into the cache memory, the method includes executing the diagnostic program instructions from within the cache memory.

10 Claims, 3 Drawing Sheets

METHOD AND SYSTEM FOR TESTING A MICROPROCESSOR

BACKGROUND OF THE INVENTION

1. Field of the Invention

This invention relates to the field of microprocessors and, more particularly, to debugging and testing of microprocessors.

2. Description of the Related Art

Integrated circuit (IC) designers use many tools to debug a new IC when it is first manufactured. Depending upon the level of complexity of the IC, the "first silicon" may be difficult if not impossible to test and debug. In some cases, the first silicon of the IC may be impossible to test if some of the subsystems associated with the IC are not functional. In other cases, the time allocated for IC debug may be necessarily long. The increased time to debug and test may adversely impact the time to market for many ICs. This may be particularly true of microprocessors.

Due to the complexity of microprocessors, and the length of the development cycle, faster and more powerful debugging tools have been developed. These tools include both features internal to the microprocessor which facilitate debugging, and external tools such as logic analyzers and debug/test software.

Some microprocessor debug and test systems may be implemented using a computer system such as a personal computer (PC). The PC is coupled to interface hardware, which is in turn coupled to the microprocessor. Software tools are executed on the PC to provide debug/test functionality. Because of the complexity of microprocessors and their functions, software debug/test tools must also be very complex. Individual tests must be conducted on the microprocessor to ensure that each of the functions of the device is properly performed. In a typical debug system, diagnostic code may be loaded into a system memory and executed by the microprocessor.

However, microprocessors may be associated with many subsystems including peripheral circuit chipsets, which if not operating, may preclude running diagnostic software routines. For example, microprocessors may rely on a basic input/output system (BIOS) read-only memory (ROM), system memory, and input/output (I/O) subsystems to simply boot up and begin executing code. If any of these subsystems are inoperative or are not present, the microprocessor may be incapable of loading and running the diagnostic software. Thus, in the absence of associated chipsets, system memory and peripheral devices, it may be difficult to debug a microprocessor using traditional test and debug methods.

SUMMARY OF THE INVENTION

Various embodiments of a method and system for testing a microprocessor are disclosed. In one embodiment, the method includes executing debug application software on an external device, downloading diagnostic program instructions from the external device to a cache memory within the microprocessor via a serial test interface. Once the diagnostic program instructions are loaded into the cache memory, the method includes executing the diagnostic program instructions from within the cache memory.

In one implementation, executing the diagnostic program instructions includes setting execution flags within a general-purpose register within the microprocessor prior to executing a breakpoint. The method further includes returning execution control to the debug software routine in response to executing the breakpoint.

In another implementation, the method further includes the debug application software reading the execution flag settings and executing predetermined tasks based upon the execution flag settings.

In yet another implementation, executing predetermined tasks includes displaying a predetermined text string on a display in response to reading a corresponding string ID value from the general-purpose register.

In another embodiment, a system for testing a microprocessor is contemplated. The system includes an external device configured to execute debug application software. Further, the system includes a motherboard including a test port which is coupled to the external device via a communication link. The debug application software is configured to cause diagnostic program instructions to be transmitted through the communication link to a cache memory within the microprocessor via a serial test interface. The debug application software is further configured to cause the microprocessor to execute the diagnostic program instructions from the cache memory.

Figure 1:
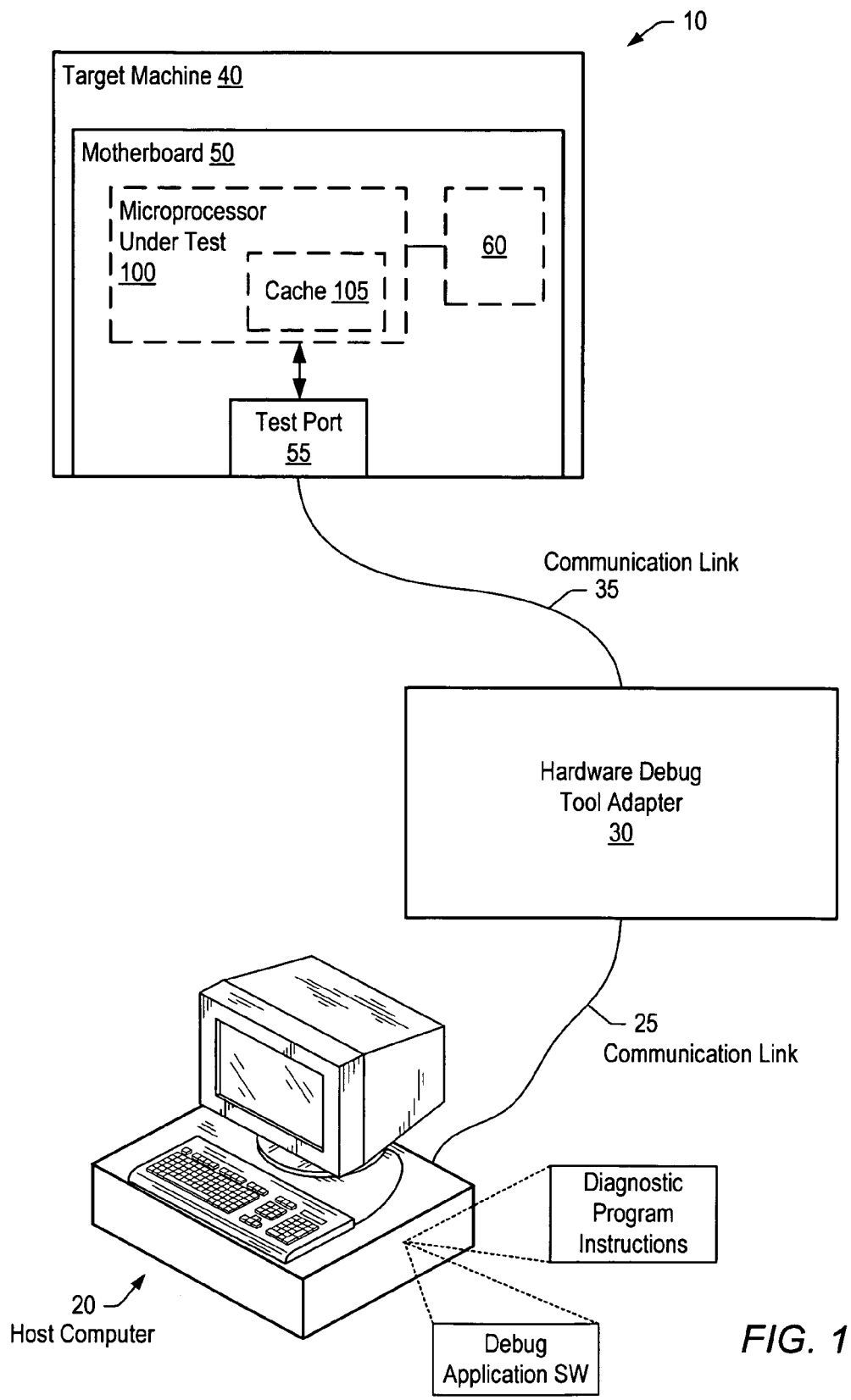
FIG. 1 is a diagram of one embodiment of a diagnostic test system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of a test system for testing a microprocessor is shown. The test system 10 includes a host computer system 20 coupled to a hardware debug adapter 30 via a communication link 25. Hardware debug adapter 30 is coupled to a target machine 40 which includes a motherboard 50. Motherboard 50 includes a microprocessor under test 100 and a test port 55. Microprocessor 100 includes an on-chip instruction cache memory 105 which is sometimes referred to as an I-cache. It is noted that in other embodiments motherboard 50 may include other integrated circuits 60 such as system memory modules, peripheral chipsets and/or a BIOS ROM, for example, which may be coupled to microprocessor 50. It is also noted that in other embodiments, other numbers of microprocessors under test may be included on motherboard 50 such as in a multi-processor environment, for example.

In one embodiment, host computer system 20 may communicate with hardware debug adapter 30 through communication link 25 using signals formatted in one protocol such as a well-known RS232 protocol, for example. Hardware debug adapter 30 may communicate with target machine 40 thru communication link 35 and test port 55 using a second protocol which may be compliant with the IEEE 1149.1 Boundary Scan Standard, which is also sometimes referred to as the joint test action group (JTAG) standard. The boundary scan standard includes a serial test interface having a plurality of externally accessible pins including TDI, TDO, TMS, TCK and TRST. Thus, hardware debug adapter 30 may include logic (not shown) configured to convert signals from one protocol to another protocol to facilitate communication between host computer system 20 and target machine 40. Further, hardware debug adapter 30 may be configured to acquire data from microprocessor 100 and to deliver that data to the debug application software running on host computer system 20 for further processing. Hardware debug adapter 30 may also provide command communications between the software and hardware.

In one embodiment, host computer system 20 may be an external device such as a personal computer (PC) capable of running debug application software and displaying the results. The software may be capable of communicating with microprocessor 100 through hardware debug adapter 30. The debug application software may provide a user interface to an entire suite of test features for debug and test of various internal microprocessor functions. In addition, the debug application software may be configured to test and debug other integrated circuits 60 that may be associated with microprocessor 100 when installed on motherboard 50. In one embodiment, the debug application software may be part of a test system referred to as a Hardware Debug Tool (HDT) by Advanced Micro Devices™.

As described above, host computer system 20 may run the debug application software which may provide an interactive test platform with which to test and debug a target machine such as target machine 40 which may include a motherboard 50, microprocessor 100 and any associated chipsets 60 and buses (not shown). The debug application software may be configured to access a test file stored in a predetermined file format such as a file format compliant with the Portable Executable (PE) format as specified by the Microsoft Developer Network or the Microsoft Disk Operating System (MS-DOS) Executable-File Header (EXE) format as specified by the MS-DOS Programmer's Reference both available from the Microsoft™ Corporation, for example. One feature of the debug application software is to download program instructions stored in the test file to I-cache 105 of microprocessor 100.

Microprocessor 100 is generally configured to execute instructions stored in a system memory (not shown). Typically instruction code may be provided to I-cache 105 by pre-fetching code from the system memory. However, since a system memory may not be available in the test environment, diagnostic program instructions may be loaded directly into I-cache 105 by debug application software and hardware debug tool adapter 30, thereby allowing microprocessor 100 to execute code without using a system memory or possibly without a functioning memory interface. In one embodiment, microprocessor 100 may employ the x86 instruction set architecture, although it is contemplated that other embodiments may employ other architectures.

In one embodiment, the test file includes a diagnostic program instruction segment and a diagnostic string segment. It is noted that in other embodiments, the diagnostic program instruction segment and the diagnostic string segment may be contained in two different test files. The diagnostic program instruction segment includes the diagnostic program instructions while the diagnostic string segment includes a plurality of text strings which may be displayed on the host computer system 20. In one embodiment, the diagnostic program instructions may be written in assembly language, although other embodiments are contemplated in which the diagnostic program instructions may be written in a higher level language such as 'C, for example. The text strings may include various predetermined text messages which may prompt the user for information such as a new test pattern to be downloaded to microprocessor 100. In one embodiment, each text string may have a unique numeric identifier. An exemplary test file text string is illustrated in table 1 below.

TABLE 1

| Example text string file segment. |
|---|
| '1, Test XX passed', |
| '2, Test YY EBX result is:', |
| '3, Test ZZ EBX result is:', |
| '4, Enter next pattern: ', |
| '5, Execution finished.' |

The test file may be stored on host computer system 20 or it may be available to host computer system 20 via one or more carrier mediums such as a removable disk, or a network server accessible via an intranet or the Internet, for example. Similarly, the debug application software may available to run on host computer system 20 through the same carrier mediums.

As will be described further below in conjunction with the description of FIG. 2, the debug application software may be configured to initialize microprocessor 100 into a predetermined test state. Once initialized, operation of microprocessor 100 may be under control of the debug application software. In the test state, microprocessor 100 may be configured to receive instructions and to transmit responses via an on-chip test interface which includes a TAP controller (not shown) which is coupled to test port 55. Test port 55 may be a test port configured to provide boundary scan connections to target machine 40. Using test port 55 and the test state, the debug application software may download instructions into I-cache 105 within microprocessor 100. In this way, the diagnostic program instructions may be loaded and executed by the core of microprocessor 100 without microprocessor 100 having to do instruction fetch cycles from system memory which may normally be associated with the execution of program code. In contrast to the diagnostic program instructions being loaded into I-cache 105, the text strings may be loaded and used by debug application software on host computer system 20. It is noted that although test port 55 is described above as providing boundary scan connections to target machine 40, in other embodiments, test port 55 may also provide test connections to a scan chain interface for other serial scan chains internal to microprocessor 100.

Once the diagnostic program instructions are loaded into I-cache 105, execution control may be handed off to microprocessor 100 which executes the diagnostic program instructions. The diagnostic program instructions may contain instructions capable of exercising internal processor hardware using test patterns supplied with the diagnostic program instructions, for example. Breakpoints may be included in the diagnostic program instructions which may allow test results and execution control to be returned to debug application software running on host computer system 20.

Debug application software may provide a user interface configured to allow program control of testing functions. In one embodiment, the user interface may be a target machine emulation window (not shown) which may be displayed as part of the host computer system 20 display. One or more of the text strings stored on host computer system 20 may be displayed in the emulation window in response to flag bits read from a register within microprocessor 100 after a breakpoint. In one embodiment, the breakpoints may use the INT3 instruction to halt processor execution of the diagnostic program instructions and to return execution control to debug application software.

The diagnostic program instructions may pass information such as test results or a request for user input to debug application software through the use of predetermined bits of the general-purpose registers within microprocessor 100. For example, upon breakpoint entry, the diagnostic may modify a register such as the EAX register such that the debug application software may access the registers and perform various tasks dependent upon the contents therein. In one embodiment, some of the EAX bits may represent a string ID. The string ID may contain a numerical identifier of one of the text strings described above to be displayed. Another EAX bit may be a text string enable bit, which when asserted, may cause the string identified by the string ID bits to be displayed in the emulation window. Another EAX bit may be indicative of whether the contents of another register such as the EBX register, for example, will be displayed in the emulation window. Yet another EAX bit may be indicative of whether diagnostic execution shall resume upon completion of indicated tasks. Another EAX bit may be indicative of whether the EAX register contains a user-input value after execution is resumed. Another EAX bit may be indicative that the diagnostics are completed and that microprocessor 100 may be reset. An exemplary register configuration is described in more detail below in conjunction with the description of FIG. 3.

Thus, by downloading diagnostic program instructions to the I-cache 105 of microprocessor 100 and executing those instructions directly, internal processor hardware functionality may be tested without relying on many of the processor support hardware normally associated with a computer system.

It is noted that although host computer system 20 is described as a PC in the above embodiments, it is contemplated that in other embodiments host computer system 20 may be implemented as a dedicated test fixture capable of running the debug application software for testing microprocessors and computer platforms. In such embodiments, host computer system 20 may communicate directly with target machine 40 without using a hardware debug adapter 30. It is further noted that although the above embodiments describe the EAX and EBX registers of microprocessor 100 being used by diagnostic program instructions to pass information to debug application software, it is contemplated that in other embodiments, other registers may be used.

Figure 2:
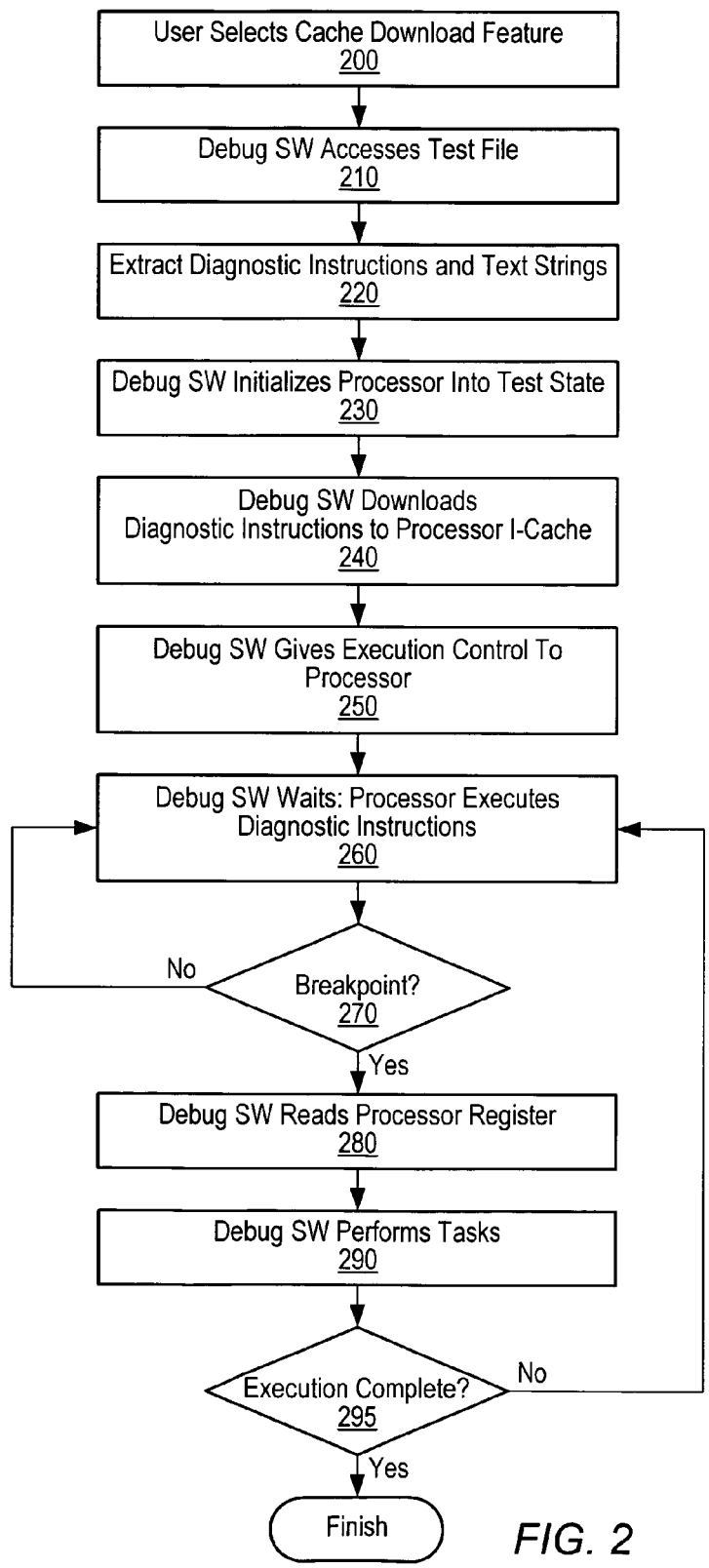
FIG. 2 is a flow diagram illustrating operation of one embodiment of the diagnostic test system of FIG. 1.

Turning to FIG. 2, a flow diagram illustrating the operation of one embodiment of a test system for testing microprocessor 100 is shown. As described above, host computer system may provide an interactive user interface to test target machine 40 including microprocessor 100. In one embodiment, the user interface may include one or more emulation windows which may allow a user to enter information, read the results of a given diagnostic executing on microprocessor 100 and to generally control testing and debug of target machine 40.

In one embodiment, the debug application software may include a menu of test and debug features. One such feature is known as an I-cache download feature. In response to a user selecting the I-cache download feature (block 200), debug application software retrieves and accesses a test file (block 210). The debug application software may extract the diagnostic program instructions and the diagnostic text strings for testing microprocessor 100 (block 220).

The debug application software initializes microprocessor 100 into a test state (block 230). In one embodiment, hardware debug tool adapter 30 may interpret software commands from debug application software and cause a debug pin on microprocessor 100 to be asserted during a reset sequence. After the reset sequence, execution of instructions by microprocessor 100 is under control of debug application software and microprocessor 100 may be configured to accept commands through a tap controller (not shown) which is coupled to test port 55 of motherboard 50. Thus, debug application software may download the diagnostic program instructions to I-cache 105 through hardware debug adapter 30, where the diagnostic program instructions may be interpreted and formatted for transfer to microprocessor 100 (block 240). As described above, the tap controller may be compatible with the JTAG interface which may serially transfer data into and out of microprocessor 100.

Once the diagnostic program instructions are loaded into I-cache 105, debug application software turns over execution control to microprocessor 100 (block 250) and waits while microprocessor 100 executes the diagnostic program instructions stored within I-cache 105 (block 260). The diagnostic program instructions may include instructions which access and exercise hardware internal to microprocessor 100 by applying test patterns and test conditions, for example. In addition, the diagnostic program instructions may include breakpoints which, when executed, halt execution of the diagnostics on microprocessor 100. If no breakpoint is encountered (block 270), debug application software waits for notification that a breakpoint has occurred.

Dependent upon the type of diagnostic routines being run by microprocessor 100, user intervention may be necessary at predetermined points in the diagnostic. In one embodiment, the diagnostic routine may run a test pattern. When the pattern is complete, the result may be written into register EBX. If the diagnostic needs a second pattern, the user may be prompted for the pattern using a text string. Thus, for this example, the EAX register is written with a valid string ID, the display string bit is set, the display EBX contents bit is set, the resume execution bit is set and the user input bit is set. Once the EAX and EBX registers are written, a breakpoint may be executed. In response to the breakpoint (block 270), debug application software performs a read of the EAX and EBX registers (block 280). Debug application software interprets the EAX register bits and performs the tasks indicated by the register bits (block 290). From the above example, debug application software may access the diagnostic text strings that were extracted from the test file and display the text string corresponding to the string ID read from the EAX register. In this example, the text string may prompt the user to enter a test pattern. Debug application software may display the contents of the EBX register and also provide a data entry window for the requested test pattern. When the tasks have been completed, since the execution completed bit was not asserted in the EAX register indicative of the diagnostic program instructions not being completed (block 295), debug application software returns execution control to microprocessor 100 (block 250)

and execution of the diagnostic program instructions continues as described above. In this example, diagnostic program instructions may resume by reading the contents of the EAX register which may now contain the values input by the user.

However, if the execution completed bit were asserted in the EAX register, execution of the diagnostic program instructions would be complete (block 295) and debug application software may terminate the I-cache feature for that session and micr0processor 100 may be reset since the diagnostic is finished.

Figure 3:
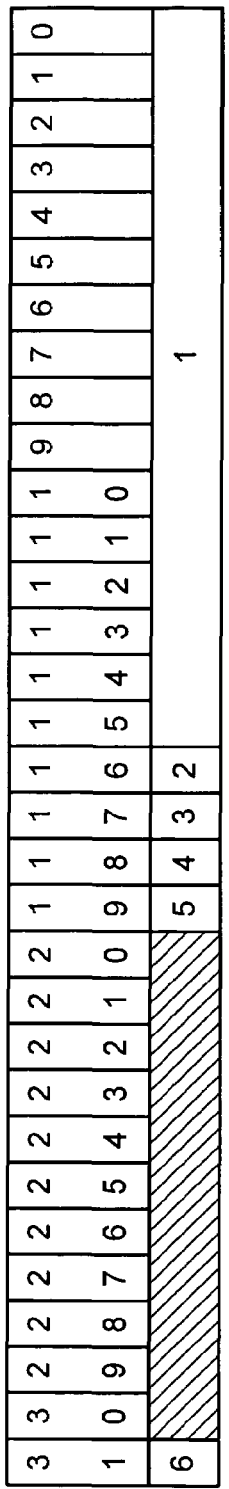
FIG. 3 is a diagram of one embodiment the bit assignments of a general-purpose register during diagnostic testing of microprocessor 100.

Referring to FIG. 3, a diagram of one embodiment the bit assignments of a general-purpose register during diagnostic testing of microprocessor 100 is shown. General-purpose register 300 is representative of any 32-bit general-purpose register of microprocessor 100. As described above, the diagnostic program instructions and the debug application software both use general-purpose register 300 to pass information. As will be described further below, various bits within general-purpose register 300 are used as execution flags indicative of a predetermined task to be performed by debug application software.

In the illustrated embodiment, the 32 bits are arranged into 6 designated sections and labeled 1–6. Section 1 includes bits 0–15 and corresponds to a string ID value of a string to be displayed by host computer system 20. The string ID value may be represented by four hexadecimal digits. Section 2 includes bit 16 which selectively enables the string identified by the STR_ID bits to be displayed by host computer system 20. Section 3 includes bit 17 which selectively enables the contents of another general-purpose register such as the EBX register, for example, to be displayed in hexadecimal format by host computer system 20. Section 4 includes bit 18, which selectively enables microprocessor 20 to resume execution of diagnostic program instructions upon completion of indicated tasks. Section 5 includes bit 19, which is indicative that general-purpose register 300 will contain a user-input value upon resuming execution of the diagnostic program instructions. Section 6 includes bit 31 which is indicative of whether execution of the diagnostic program instructions is complete and microprocessor 100 may be reset. The remaining shaded bits are reserved. Thus, the valid bit combinations include $0001XXXX_{16}$, $0003XXXX_{16}$, $0007XXXX_{16}$, $000FXXXX_{16}$ and $8001XXXX_{16}$.

It is noted that although the above embodiments describe particular sections having particular bit position designations, other embodiments may use different bit positions for the particular sections. In addition, other embodiments are contemplated in which additional bits and sections may be used for additional tasks.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for testing a microprocessor comprising:
   executing debug application software on an external device;
   downloading diagnostic program instructions from said external device to a cache memory within said microprocessor via a serial test interface;
   executing said diagnostic program instructions from within said cache memory;
   wherein executing said diagnostic program instructions includes setting execution flags within a general-purpose register within said microprocessor prior to executing a breakpoint;
   returning execution control to said debug application software in response to executing said breakpoint; and
   said debug application software reading said execution flag settings and executing predetermined tasks including displaying a predetermined text string on a display in response to reading a corresponding string ID value from said general-purpose register based upon said execution flag settings.

2. The method as recited in claim 1, wherein said serial test interface is a boundary scan interface compatible with the IEEE 1149.1 standard and includes a plurality of externally accessible pins including TDI, TDO, TMS, TCK and TRST.

3. The method as recited in claim 1 further comprising giving execution control to said microprocessor to execute said diagnostic program instructions.

4. The method as recited in claim 1, wherein said cache memory is an instruction cache.

5. The method as recited in claim 1 further comprising executing said diagnostic program instructions from within said cache memory without using fetch cycles to a system memory.

6. A system for testing a microprocessor comprising:
   an external device configured to execute debug application software; and
   a motherboard including a test port coupled between said external device and said microprocessor via a communication link;
   wherein said debug application software is configured to cause diagnostic program instructions to be transmitted through said communication link to a cache memory within said microprocessor via a serial test interface;
   wherein said debug application software is further configured to cause said microprocessor to execute said diagnostic program instructions from said cache memory;
   wherein said diagnostic program instructions are configured to set execution flags within a general-purpose register within said microprocessor prior to executing a breakpoint, and to return execution control to said debug application software in response to executing said breakpoint; and
   wherein said debug application software is further configured to read said execution flag settings and based upon said execution flag settings, to execute predetermined tasks including displaying a predetermined text string on a display of said external device in response to reading a corresponding string ID value from said general-purpose register.

7. The system as recited in claim 6, wherein said serial test interface is a boundary scan interface compatible with the IEEE 1149.1 standard and includes a plurality of externally accessible pins including TDI, TDO, TMS, TCK and TRST.

8. The system as recited in claim 6, wherein said debug application software is further configured to give execution control to said microprocessor to execute said diagnostic program instructions.

9. The system as recited in claim 6, wherein said cache memory is an instruction cache.

10. The system as recited in claim 6, wherein said diagnostic program instructions are executable from within said cache memory without using fetch cycles to a system memory.

* * * * *